W. P. McGEOUCH.
MACHINE FOR CUTTING RUBBER RINGS.
APPLICATION FILED JUNE 29, 1909.
948,401.
Patented Feb. 8, 1910.
5 SHEETS—SHEET 2.
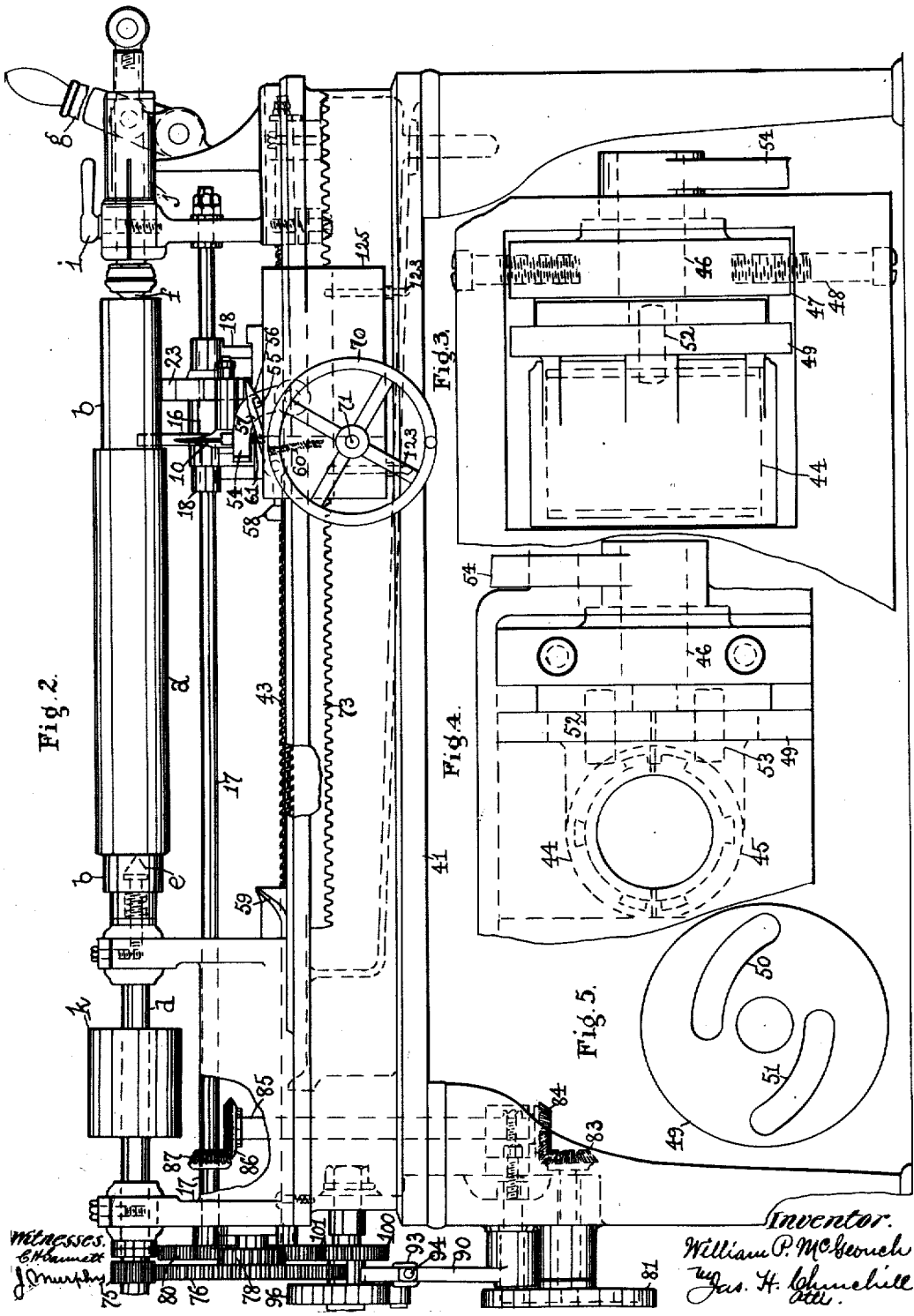
Witnesses.
C. H. Bennett
J. Murphy
Inventor.
William P. McGeouch
Jas. H. Churchill
Atty.

W. P. McGEOUCH.
MACHINE FOR CUTTING RUBBER RINGS.
APPLICATION FILED JUNE 29, 1909.
948,401.
Patented Feb. 8, 1910.
5 SHEETS—SHEET 3.
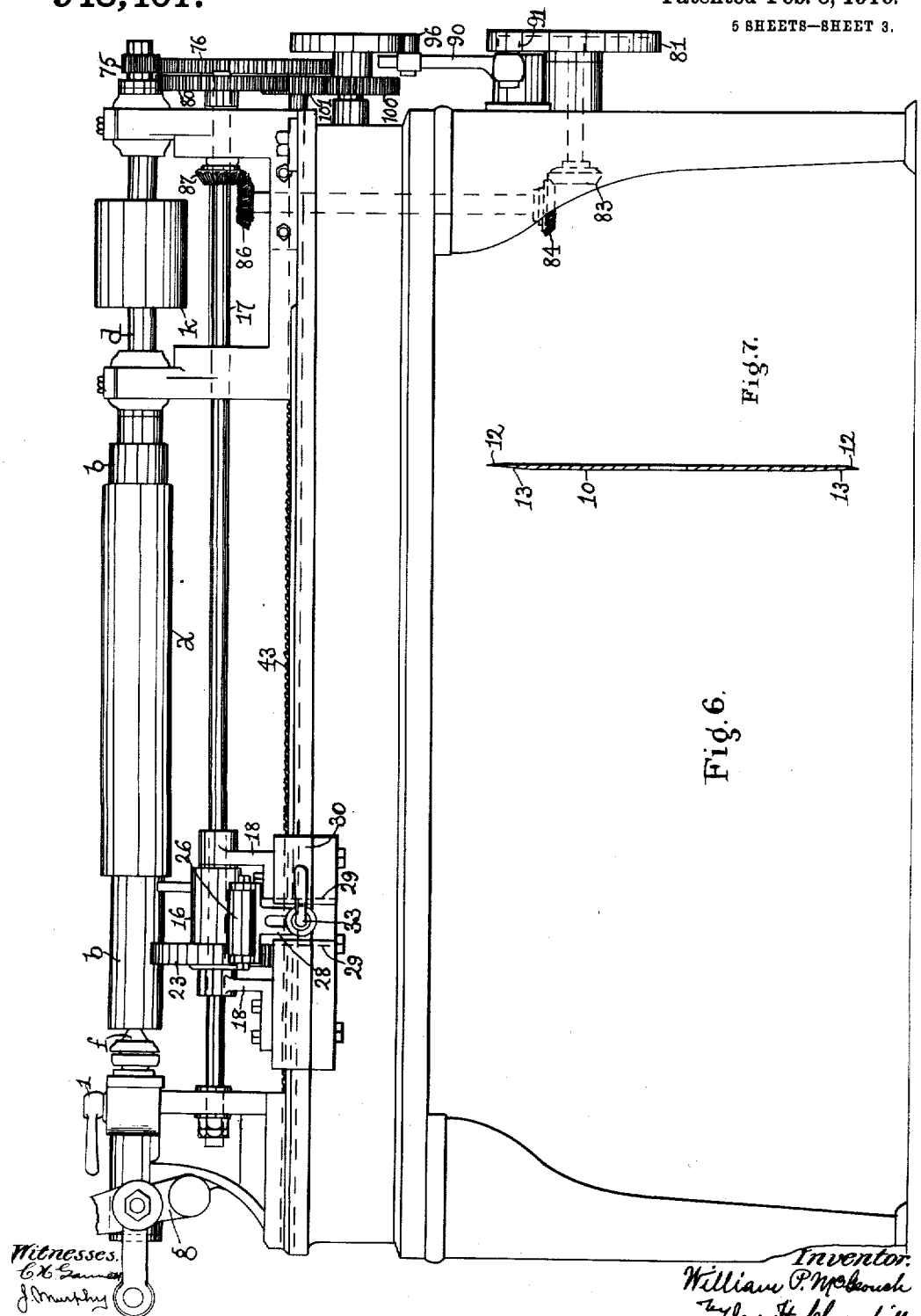

UNITED STATES PATENT OFFICE.

WILLIAM P. McGEOUCH, OF SOMERVILLE, MASSACHUSETTS.

MACHINE FOR CUTTING RUBBER RINGS.

948,401.  Specification of Letters Patent.  Patented Feb. 8, 1910.

Application filed June 29, 1909. Serial No. 505,038.

*To all whom it may concern:*

Be it known that I, WILLIAM P. McGEOUCH, a citizen of the United States, residing in Somerville, county of Middlesex, and State of Massachusetts, have invented an Improvement in Machines for Cutting Rubber Rings, of which the following description, in connection with the accompanying drawings, is a specification, like letters on the drawings representing like parts.

This invention relates to a machine for cutting individual rings from a sleeve or tube of rubber or other material and is especially designed and adapted for cutting rubber rings employed for sealing fruit and like jars.

The present invention has for its object to provide a simple and efficient machine for the purpose specified, which is automatic in its operation, and with which a maximum number of rings can be cut in a minimum time, and a more perfect ring obtained as will be described. To this end, I employ a rotatable disk knife or cutter mounted on a carriage, which is moved intermittently longitudinally of the rubber tube or sleeve to be severed into rings, and provision is made whereby the disk knife is rendered effective upon the rubber tube while the said carriage is at rest.

In the embodiment of the invention herein shown, the disk knife is automatically moved toward and from the rubber tube or sleeve by a rotatable cam, which is timed with relation to the rotation of the mandrel upon which the rubber tube or sleeve is mounted, so that the points at which the knife successively engages the said tube or sleeve are in substantially the same straight line extended longitudinally of the said tube or sleeve. Provision is also made for automatically stopping the carriage at the end of its travel in one direction and for returning the same to its starting position. The disk cutter is preferably provided with a cutting edge having different degrees of bevel or inclination for a purpose as will be described.

These and other features of this invention will be pointed out in the claims at the end of this specification.

Figure 1:
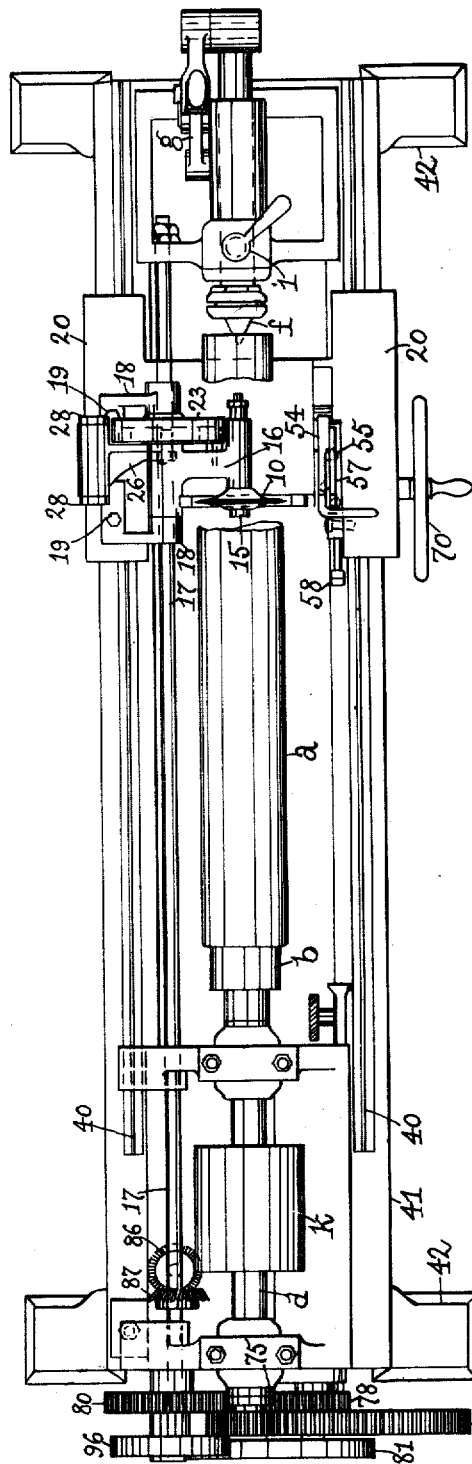
Figure 8:
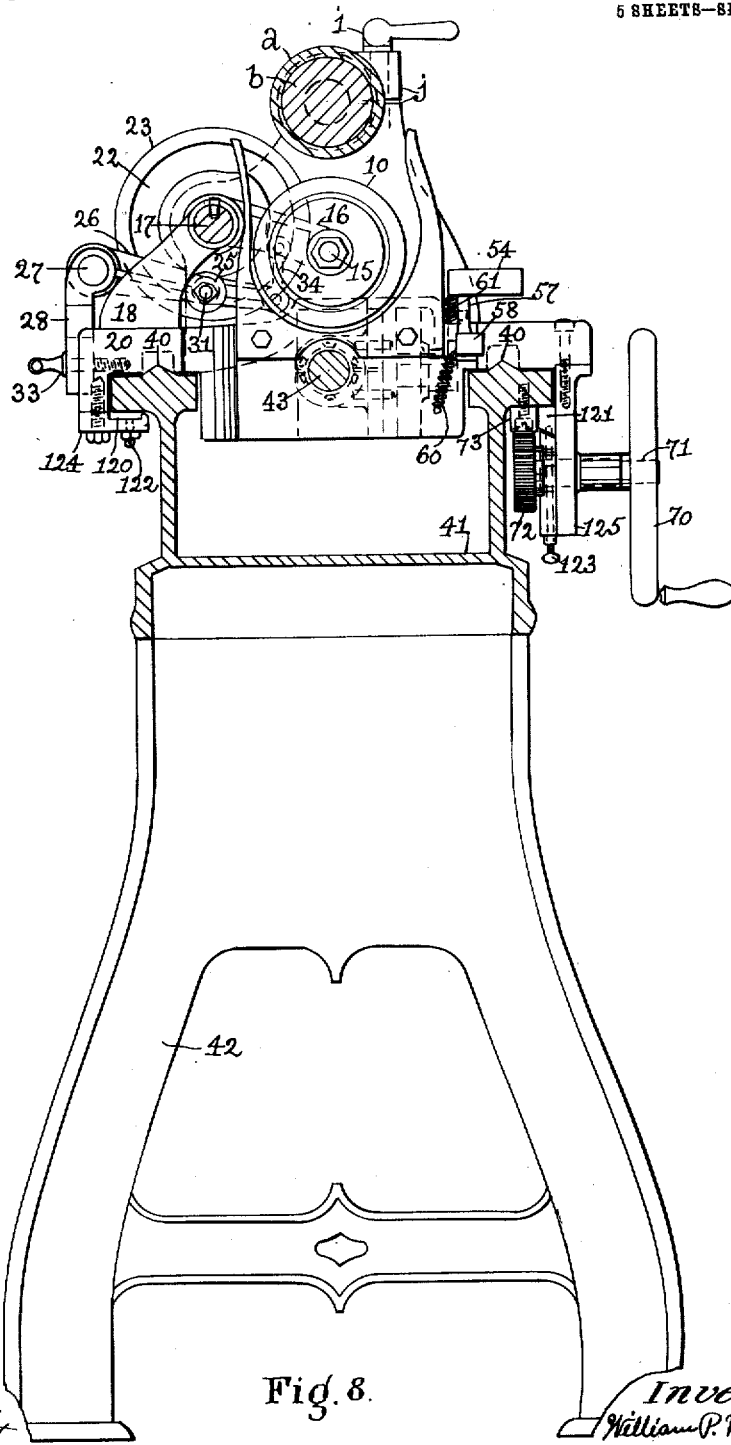
Figure 9:
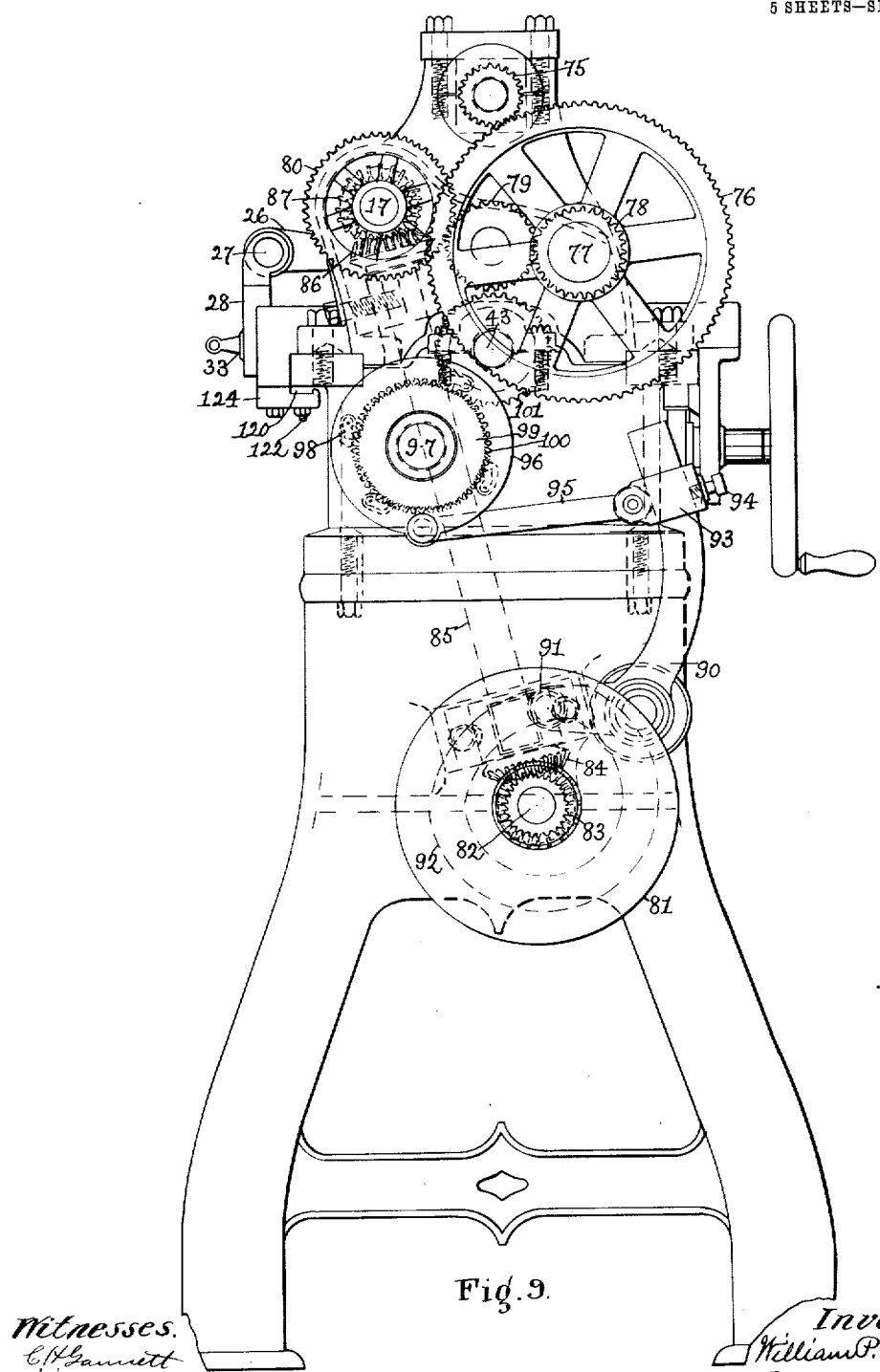

Figure 1 is a plan view with parts broken away of a machine embodying this invention. Fig. 2, a front elevation of the machine shown in Fig. 1. Figs. 3, 4 and 5, details to be referred to. Fig. 6, a rear elevation of the machine shown in Fig. 1. Fig. 7, an enlarged section of the disk cutter or knife preferred by me. Fig. 8, a cross-section on the line 8—8, Fig. 2, and Fig. 9, an end elevation of the machine shown in Fig. 1, looking toward the right.

Referring to the drawings, $a$ represents a tube or sleeve of rubber or other material, which is to be cut up into rings, and $b$ a suitable mandrel upon which said tube is mounted. The mandrel $b$ is designed to be rotated by a main shaft $d$, to which it is detachably secured by centering points $e$, $f$, the centering point $f$ being capable of longitudinal movement by means of a lever $g$, in a manner well understood, to enable the mandrel to be placed into and removed from operative relation to the main shaft $d$. The center point $f$ is secured in its operative position by a clamping screw $i$, which engages a split hub $j$ in which the spindle of the centering point slides. The main shaft $d$ as shown is rotated at a substantially high speed by a pulley $k$ which is driven by a belt (not shown). The mandrel $b$ has coöperating with it a rotatable disk knife or cutter 10 provided with a cutting edge on its circumference, which edge is preferably made by providing the opposite sides of the disk with bevels or inclines 12, 13, of different degrees or angles, for a purpose as will be described.

The disk knife or cutter 10 is designed to sever the individual rings from the sleeve or tube $a$, and in the present instance, said disk cutter is located below the mandrel and is loosely mounted on a shaft or pin 15 (see Figs. 1 and 8) supported by a lever 16, mounted to turn on a shaft 17 between arms 18 secured as by screws or bolts 19 to a carriage 20. The cutter carrying lever 16 is automatically turned on the shaft 17 to raise and lower the disk cutter 10, so as to engage it with the sleeve or tube $a$ and effect the cutting off of a ring, and then lower the said cutter to permit the latter to be fed or moved longitudinally of the tube or sleeve $a$ and bring the said cutter into position to cut the next ring.

In the present instance, the disk cutter 10 is rotated by contact with the revolving tube or sleeve $a$, and is bodily moved toward and from the said tube or sleeve by mechanism as will now be described. The mechanism referred to may and preferably will be made as herein shown and consists of a cam 22, herein shown as a path cam in the side of a disk 23, which is keyed or splined on the shaft 17 to rotate therewith and to move longitudinally thereon, said cam disk being located between one of the arms 18 and the lever 16 (see Fig. 1).

The cam path 22 has extended into it a roller 25, (see dotted lines, Fig. 8) on a lever 26 having its rear end mounted on a pivot pin 27, supported in the forked end of a slide block 28, vertically movable in guideways 29 in a depending flange 30 on the rear side of the carriage 20 (see Figs. 6 and 8). The slide block 28 is capable of being adjusted vertically so as to turn the lever 26 on the pin 31, which carries the roller 25, so as to initially position the disk cutter 10 with relation to the rubber tube or sleeve $a$, and thereby adjust the cutter to tubes or sleeves of different thickness. After the cutter is initially adjusted, the slide block 28 may be secured in fixed relation to the carriage 20 by a set or clamping screw 33 in a manner well understood. The front end of the lever 26 is joined by a link 34 (see Fig. 8) to the cutter carrying lever 16. It will be observed, that the cam actuated lever 26 is practically provided with two pivots, namely, the pins 27, 31, and that said lever is turned on the pin 31 to initially position or adjust the cutter, and is turned on the pin 27 to effect the bodily movement of the cutter toward and from the mandrel $b$ and the tube or sleeve $a$ thereon.

The cam path 22 is suitably shaped and timed with relation to the rotating mandrel, so as to bodily move the cutter toward the mandrel to cut a ring from the tube or sleeve, then move the cutter away from the mandrel, and hold the same in its lowered position while the cutter carriage is being moved longitudinally with relation to the mandrel so as to bring the cutter into position to cut the next ring. The path cam 22 is also so timed with relation to the rotating mandrel, that the successive initial engagements of the cutter with the tube or sleeve $a$ are in the same or substantially the same straight line extended longitudinally of said tube, thereby reducing to a minimum the danger from this source of forming rings of uneven thickness. After each ring has been cut from the tube or sleeve $a$, the carriage, which is mounted to slide on guideways or ribs 40 on the upper surfaces of longitudinally extended front and rear sides of a supporting frame or base 41 mounted upon legs 42 as herein shown, is fed or moved forward by a screw-shaft 43 supported by the framework of the machine and with which the carriage is detachably engaged for a purpose as will be described.

The carriage 20 is provided with a split screw-threaded nut, which is of well-known construction, and the upper half 44 of which is movable toward and from the lower half 45, so that when the parts of the nut are clamped together in engagement with the screw shaft 43, rotation of the latter effects bodily movement of the carriage. Provision is made for locking the two parts or halves of the nut to the screw-shaft while the carriage is moving from one end of the machine to the other, which movement may be termed the forward movement of said carriage, and for automatically unlocking said carriage at the end of its travel. For this purpose, a rock-shaft 46 (see Figs. 2, 3 and 4) is journaled in a bearing hub 47 secured as by screws 48 to the carriage 20 and has fast on its inner end a cam disk 49, having cam slots 50, 51, into which extend pins 52, 53, secured to the upper and lower halves 44, 45, respectively. The rock-shaft 46 is provided with an arm 54 having a lug or projection 55, which is engaged by a latch 56 on a lever 57, pivoted to the carriage and provided with an arm 58, which is adapted to engage a cam or inclined block 59 attached to the frame of the machine. The latch 56 is held in engagement with the lug 55 by a spring 60, which is overcome by the cam 59, which acts on the rear arm 58 of the lever 57 and turns the latter on its pivot so as to disengage the latch from the lug 55 and permit the spring 61 to turn the arm 54 and the rock-shaft 46, so as to rotate the cam disk 49 and uncouple the nut from the screw shaft 43, thereby stopping the forward feed of the carriage, which is then free to be returned to its starting position by the hand wheel 70 mounted on a shaft 71 provided with a gear 72, which meshes with a rack bar 73 attached to the front side of the base or supporting frame 41.

Provision is made for rotating the cam shaft 71 and for rotating the screw-shaft 43, and in the present instance the cam shaft 17 is driven from the main shaft $d$ by a pinion 75 fast on the main shaft (see Fig. 9), which meshes with a gear 76 on a stud shaft 77 provided with a pinion 78, which meshes with a pinion 79, which in turn meshes with a gear 80 fast on the cam shaft 17.

The screw-shaft 43 is intermittently rotated, which is effected by means of a cam disk 81 on a shaft 82 provided with a bevel gear 83, which meshes with a bevel gear 84 on an upwardly extended shaft 85, having at its upper end a bevel pinion 86, which meshes with a bevel pinion 87 on the cam shaft 17.

The cam shaft 82 is continuously driven from the cam shaft 17, and has coöperating with it an elbow lever 90 having on one arm a roller 91, which projects into the path cam 92 in the cam disk 87, and having its other arm provided with a block 93 adjustably secured thereon by the set screw 94 and connected by a link 95 to a ring or disk 96 loosely mounted on a shaft 97 and carrying pawls 98, which coöperate with a ratchet wheel 99 fast on the shaft 97, which is provided with a gear 100 in mesh with a gear 101 fast on the screw shaft 43. The path cam 92 in the rotation of the cam disk 87 effects oscillation of the lever 90, and through the pawl carrying ring 96 and ratchet wheel 99 effects intermittent rotation of the shaft 97, gears 100, 101, and screw shaft 43.

The operation may be briefly described as follows:—The mandrel *b* with the rubber sleeve or tube *a* thereon is placed in the machine and the main shaft *d* is set in rotation in any suitable or usual manner. The operator by means of the hand wheel 70 moves the knife carriage on the bed or supporting frame so as to properly position the cutter or knife with relation to the front end of the rubber sleeve to cut a ring of the desired thickness. The carriage 20 is then clamped to the screw feed shaft 43 by turning the arm 54 so as to engage the lug 55 thereon with the latch 56. The carriage remains stationary while the knife or cutter 10 is moved by the cam 22 into contact with the rubber sleeve *a*, which contact in the present arrangement frictionally rotates the knife and effects a drawing cut of the rubber, the cutting edge of the knife or cutter being advanced through the rubber sleeve toward the mandrel, until the cutting edge has passed through the sleeve and severed the ring therefrom. The mandrel may be provided with a rubber or other yielding surface to avoid dulling the cutting edge of the knife. When a ring has been cut from the sleeve, the cutter or knife 10 is moved away from the sleeve and remains in this position while the carriage is being fed forward by the feed cam 92. The distance the carriage is fed is determined by the position of the block 93 on the lever 90, which can be adjusted thereon to vary the feed of the carriage according to the thickness of the rings to be cut. The knife or cutter is thus positioned to cut the next ring, and when properly positioned, the carriage remains stationary and the knife is again engaged with the sleeve or tube to cut off a second ring. These operations are repeated until the tube or sleeve has been cut up into rings, at or about which time the arm 58 of the lever 57 is acted upon by the stationary cam 59 and the carriage is released from the screw-shaft and its forward feed stopped. It can thus be returned to its starting position by the hand wheel 70. The mandrel *b* is then removed and replaced by a new mandrel and tube and the carriage is again clamped to the feed shaft.

The cutting edge of the knife or cutter is preferably provided with sides or faces of different bevels or angles, one of which is materially longer than the other, the longer bevel being presented to the uncut portion of the sleeve or tube and the shorter one to the portion being cut off, so that the shorter side may act as a wedge to open up or separate the partially cut ring from the uncut sleeve or tube, while the longer side engages the uncut portion and exerts practically no compressive action on the uncut portion of the sleeve or tube, which insures uniformity in the thickness and shape of the rings, whereby a superior ring is obtained. I have obtained excellent results with a knife or cutter having the side 12 of 25 degrees and the side 13 of two degrees. In the present instance, the rotatable cutter or knife is shown as driven by frictional contact with the sleeve or tube being cut, but it is not desired to limit the invention in this respect.

The gear 76 is made removable so that it can be quickly and easily replaced by gears of different sizes to regulate the speed of the cam shaft 17 with relation to the main shaft, and thereby adjust the same to sleeves or tubes of different qualities of material.

The carriage 20 is retained on the bed or frame as shown by gibs 120, 121, (see Fig. 8), which engage the under surface of the sides of the said frame and are adjustable to take up wear by screws 122, 123, carried by arms 124, 125, attached to said carriage.

Claims.

1. In a machine of the character described, in combination, a tube-supporting mandrel, a carriage movable intermittently in the direction of the length of said mandrel, means for effecting intermittent movement of said carriage, and a rotatable knife movable simultaneously with said carriage and coöperating with said mandrel to effect the cutting of rings from a tube on the mandrel while the said carriage is at rest.

2. In a machine of the character described, in combination, a tube supporting mandrel, a carriage mounted adjacent to and intermittently movable parallel to said mandrel, a knife support mounted on said carriage to move simultaneously therewith, a rotary knife mounted on said support, and means to adjust said support on said carriage to position the knife with relation to said mandrel.

3. In a machine of the character described, in combination, a tube-supporting mandrel, a rotatable knife arranged with its cutting edge substantially at right angles to said mandrel and coöperating with a tube on said mandrel to successively cut the same into rings, a carriage intermittently movable longitudinally of the mandrel, a support for said knife mounted on said carriage to move simultaneously therewith, and means mounted on said carriage for moving said knife toward said mandrel, substantially as described.

4. In a machine of the character described, in combination, a tube-supporting mandrel, and a carriage, one of said parts being movable longitudinally with relation to the other intermittently, a rotatable knife, a support for said knife mounted on said carriage and movable toward a tube on said mandrel to cause the knife to engage therewith and cut the same into rings while the said movable part is at rest and to be disengaged therefrom while said movable part is in motion.

5. In a machine of the character specified, in combination, a tube-supporting mandrel, a rotatable knife coöperating with a tube on said mandrel to cut the same into rings, a support for said knife movable toward and from said mandrel, a carriage upon which said knife support is mounted, means for intermittently moving said carriage longitudinally with relation to said mandrel, and means for moving said knife-support toward said mandrel while the carriage is stationary, substantially as described.

6. In a machine of the character specified, in combination, a tube-supporting mandrel, a rotatable knife coöperating with a tube on said mandrel to cut the same into rings, a lever supporting said knife, a rotatable cam, a lever connected with the knife-supporting lever and actuated by said cam, an adjustable support for said actuating lever, a carriage to which said adjustable support is secured, means for moving said carriage longitudinally of said mandrel, and means for rotating said cam, substantially as described.

7. In a machine of the character specified, in combination, a tube-supporting mandrel, a rotatable knife movable toward and from said mandrel to cut rings from a tube thereon, means for effecting bodily movement of said knife toward and from said mandrel, a pivoted support for said knife, a carriage for said pivoted support and means to intermittently move said carriage longitudinally of said mandrel, substantially as described.

8. In a machine of the character specified, in combination, a tube-supporting mandrel, and a rotatable disk knife coöperating therewith to cut rings from a tube on said mandrel, said disk knife having a cutting edge formed by beveled faces of different angles or inclinations, for the purpose specified.

9. In a machine of the character described, in combination, a tube-supporting mandrel, a rotatable knife coöperating therewith to cut rings from a tube thereon, a carriage for said knife, means for automatically moving said carriage longitudinally of the said mandrel in one direction, and means for automatically releasing said carriage from its actuating means at the end of the movement of the carriage in one direction, substantially as described.

10. In a machine of the character described, in combination, a tube-supporting mandrel, a rotatable knife coöperating therewith to cut rings from a tube thereon, a carriage for said knife, means for automatically moving said carriage longitudinally of the said mandrel in one direction, means for automatically releasing said carriage from its actuating means at the end of the movement of the carriage in one direction, and means for manually moving the said carriage in the opposite direction, substantially as described.

11. In a machine of the character described, in combination, a tube supporting mandrel, a rotatable knife coöperating therewith and bodily movable toward and from the same and longitudinally thereof, a carriage for said knife, means for intermittently feeding the said carriage longitudinally of said mandrel, means for effecting bodily movement of the knife toward said mandrel and means for varying the feed of the carriage, substantially as described.

12. In a machine of the character described, in combination, a rotatable tube supporting mandrel, a rotatable knife coöperating with the tube on said mandrel to be rotated by frictional contact with said mandrel, a carriage for said knife, means to intermittently feed said carriage longitudinally of the mandrel, and means for varying the feed of the carriage according to the thickness of the rings to be cut, substantially as described.

13. In a machine of the character described, in combination, a tube-supporting mandrel, a carriage movable intermittently in the direction of the length of said mandrel, means for effecting intermittent movement of said carriage, a rotatable knife movable with said carriage and coöperating with said mandrel to effect the cutting of rings from a tube on the mandrel while the said carriage is at rest, and means for varying the length of movement of said carriage according to the thickness of the rings to be cut.

14. In a machine of the character described, in combination, a tube-supporting mandrel, and a knife-carrier, one of said parts being movable longitudinally with relation to the other, means for intermittently feeding said movable part, means for effecting successive engagement of the knife with a tube on said mandrel to cut the same into rings, and means for varying the intermittent feed to enable the machine to cut rings of different thickness, substantially as described.

In testimony whereof, I have signed my name to this specification in the presence of two subscribing witnesses.

WILLIAM P. McGEOUCH.

Witnesses:
ARTHUR E. WISDOM,
EDWARD C. DREW.